United States Patent Office 3,151,151
Patented Sept. 29, 1964

3,151,151
1-ETHYNYLCYCLOHEXYLOXYALKYL ESTERS OF CHLOROALIPHATIC MONOCARBOXYLIC ACIDS
Roger F. Monroe, Tulsa, Okla., assignor to The Dow Chemical Company, Midland, Mich., a corporation of Delaware
No Drawing. Filed Feb. 26, 1960, Ser. No. 11,164
6 Claims. (Cl. 260—487)

This invention is directed to the 1-ethynylcyclohexyloxyalkyl esters of chloroaliphatic monocarboxylic acids having the formula

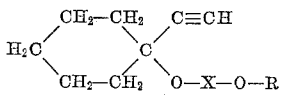

In the above and succeeding formulae, X represents an alkylene radical containing from 2 to 3 carbon atoms, inclusive, and R represents a chloroalkanoyl radical containing from 3 to 5 carbon atoms, inclusive. These new compounds are liquid materials which are somewhat soluble in many organic solvents and of very low solubility in water. They are useful as plant growth control materials and are adapted to be employed for the control of the growth and the killing of weeds and for the sterilization of soil with regard to plant growth. The compounds are also useful as parasiticides for the control of many insect, bacterial and fungal organisms.

The ester compounds may be prepared by the reaction of a chloroaliphatic monocarboxylic acid (ROH) such as chloroacetic acid, trichloroacetic acid, 2,3-dichloropropionic acid, 2,2-dichloropropionic acid, 2,2,3-trichloropropionic acid, 2,3-dichlorobutyric acid, 2,2-dichlorobutyric acid, 2,2-dichloroisovaleric acid and 2,2,3-trichlorovaleric acid with a 1-ethynylcyclohexyloxy alkanol of the formula

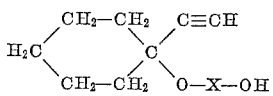

The reaction may be carried out in the presence of an esterification catalyst such as sulfuric acid, phenol sulfuric acid or a cation exchange resin in the acid form, and conveniently in an organic solvent as reaction medium such as benzene or toluene. The reaction takes place smoothly at the temperature range of from 40° to 150° C. with the production of the desired ester product and water of reaction. The molar ratio of the reactants to be employed is not critical since some of the desired product is produced with any proportion of the reagents. However, good results are obtained when employing substantially equimolecular proportions of the reactants. The employment of an excess of the alcohol and the removal of the water of reaction as formed generally results in optimum yields.

In carrying out the reaction, the chloroaliphatic monocarboxylic acid, ethynylcyclohexyloxy alkanol and catalyst, if employed, are mixed together and heated at a temperature of from 40° to 150° C. for a period of time to complete the reaction. In an alternative procedure, the acid, alcohol and catalyst, if employed, are contacted in a reaction medium such as a water immiscible organic solvent. The contacting is carried out at the boiling temperature. During the contacting of the reagents, a mixture of water of reaction and some of the water immiscible solvent is continuously distilled from the reaction zone, condensed, the water separated and the solvent recycled. Upon completion of the reaction, the desired product may be separated by fractional distillation under reduced pressure. In an alternative method of separation, the reaction mixture may be neutralized with an alkali such as dilute aqueous sodium carbonate. The neutralized mixture divides into an aqueous layer and an organic layer. The organic layer is separated, washed with water and fractionally distilled under reduced pressure to separate the desired product.

The following examples merely illustrate the invention and are not to be construed as limiting:

*Example 1.—2-(1-Ethynylcyclohexyloxy)Ethyl Ester of 2,2-Dichloropropionic Acid*

2-(1-ethynylcyclohexyloxy) ethanol (338 grams; 2 moles) is added portionwise to 143 grams (2 moles) of 2,2-dichloropropionic acid dispersed in 500 milliliters of benzene. The addition is carried out with stirring and at the boiling temperature of the reaction mixture. During the addition, a mixture of benzene and water of reaction is distilled out of the reaction zone, the water separated and the benzene recycled. Upon completion of the reaction, as is evidenced by the collection of approximately two moles of water of reaction, the reaction mixture is fractionally distilled under reduced pressure to obtain a 2-(1-ethynylcyclohexyloxy)ethyl ester of 2,2-dichloropropionic acid product boiling at 175° C. at 3.2 millimeters pressure. This product has a density of 1.1674 at 25° C. and a refractive index $n/D$ of 1.4792 at 25° C.

In a similar manner, other 1-ethynylcyclohexyloxyalkyl esters of the chloroaliphatic monocarboxylic acids may be prepared as follows:

2-(1-ethynylcyclohexyloxy)ethyl ester of chloroacetic acid (having a molecular weight of 244) by reacting together 2-(1-ethynylcyclohexyloxy)ethanol and chloroacetic acid.

2-(1-ethynylcyclohexyloxy)ethyl ester of trichloroacetic acid (density of 1.2427 at 25° C.; $n/D$ of 1.4875 at 25° C.) by reacting together 2-(1-ethynylcyclohexyloxy)ethanol and trichloroacetic acid.

2-(1-ethynylcyclohexyloxy)-1-methylethyl ester of trichloroacetic acid ($n/D$ of 1.4800 at 25° C.) by reacting together 2-(1-ethynylcyclohexyloxy)-1-methylethanol and trichloroacetic acid.

2-(1-ethynylcyclohexyloxy)-1-methylethyl ester of chloroacetic acid ($n/D$ of 1.4930 at 25° C.) by reacting together 2-(1-ethynylcyclohexyloxy)-1-methylethanol and chloroacetic acid.

2-(1-ethynylcyclohexyloxy)-1-methylethyl ester of 2,2-dichloropropionic acid ($n/D$ of 1.4724 at 25° C.) by reacting together 2-(ethynylcyclohexyloxy)-1-methylethanol and 2,2-dichloropropionic acid.

3-(1-ethynylcyclohexyloxy)propyl 2,2-dichlorobutyric acid (having a molecular weight of 322) by reacting together 3-(1-ethynylcyclohexyloxy)propanol and 2,2-dichlorobutyric acid.

2-(1-ethynylcyclohexyloxy)ethyl ester of 2,3-dichloropropionic acid (molecular weight of 293) by reacting together 2-(1-ethynylcyclohexyloxy)ethanol and 2,3-dichloropropionic acid.

2-(1-ethynylcyclohexyloxy)ethyl ester of 2,3-trichloropropionic acid (molecular weight of 327) by reacting together 2-(1-ethynylcyclohexyloxy)ethanol and 2,2,3-trichloropropionic acid.

2-(1-ethynylcyclohexyloxy)-2-methylethyl ester of 2,2-dichloroisovaleric acid (molecular weight of 335) by reacting together 2-(1-ethynylcyclohexyloxy)-2-methylethanol and 2,2-dichloroisovaleric acid.

2-(1-ethynylcyclohexyloxy)ethyl ester of 2,2-dichlorovaleric acid (molecular weight of 322) by reacting together 2-(1-ethynylcyclohexyloxy)ethanol and 2,2-dichlorovaleric acid.

The new ester compounds of the present invention are effective as herbicides and parasiticides. For such use, the products may be dispersed on an inert finely divided solid and employed as dusts. Such mixtures may be dispersed in water with or without the aid of a surface active agent and the resulting aqueous suspensions employed as sprays. In other procedures, the products may be employed as active constituents in oil-in-water or water-in-oil emulsions or aqueous dispersions. In representative operations, substantially complete controls of the growth of the seeds and emerging seedlings of wild oats, radish and millet are obtained with the 2-(1-ethynylcyclohexyloxy)-ethyl ester of 2,2-dichloropropionic acid when applied at the rate of 50 pounds per acre to soil previously planted with said plant species.

The 1-ethynylcyclohexyloxy alkanols employed as starting materials in accordance with the teachings of the present invention may be prepared by reacting one molecular proportion of propylene oxide or ethylene oxide with about one molecular proportion of 1-ethynylcyclohexanol. The reaction is carried out in the presence of a catalyst such as triethylamine and takes place smoothly at temperatures of from 70° to 175° C. and under a pressure of from 125 to 175 pounds per square inch. In carrying out the reaction, the reactants and catalysts are mixed together and the mixture heated at a temperature of from 70° to 175° C. and under an autogenous pressure of from 125 to 175 pounds per square inch. Upon completion of the reaction, the reaction mixture is fractionally distilled under reduced pressure to separate the desired product. Preferred products of the invention are the esters of the 2,2-dichloro, 2,3-dichloro and 2,2,3-trichloro-alkanoic acids containing at least three carbon atoms.

I claim:
1. The esters corresponding to the formula

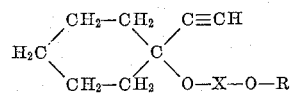

in which X represents an alkylene radical containing from 2 to 3 carbon atoms, inclusive, and R represents a chloroalkanoyl radical containing from 3 to 5 carbon atoms inclusive.

2. 2-(1-ethynylcyclohexyloxy)ethyl ester of 2,2-dichloropropionic acid.

3. 2-(1-ethynylcyclohexyloxy)ethyl ester of trichloroacetic acid.

4. 2-(1-ethynylcyclohexyloxy)-1-methylethyl ester of 2,2-dichloropropionic acid.

5. 3-(1-ethynylcyclohexyloxy)propyl ester of 2,2-dichlorobutyric acid.

6. 2-(1-ethynylcyclohexyloxy)-2-methylethyl ester of 2,2-dichloroisovaleric acid.

References Cited in the file of this patent

UNITED STATES PATENTS

| | | |
|---|---|---|
| 2,550,049 | Eaker | Apr. 24, 1951 |
| 2,642,354 | Barrons | June 16, 1953 |
| 2,802,878 | Monroe et al. | Aug. 13, 1957 |
| 2,852,555 | Pumpelly | Sept. 16, 1958 |
| 2,880,082 | Toornman | Mar. 31, 1959 |